2,985,661

PREPARATION OF 2(O-AMINOPHENYL)-BENZIMIDAZOLE

Delton W. Hein, Somerville, Robert J. Alheim, Middlesex Borough, and Julian J. Leavitt, Plainfield, N.J., assignors to American Cyanamid Company, New York, N.Y., a corporation of Maine No Drawing. Filed Feb. 6, 1956, Ser. No. 563,414

1 Claim. (Cl. 260—309.2)

This invention relates to a general process for making certain aryleneazoles of the general formula

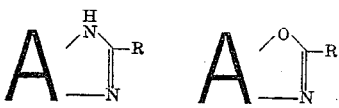

and

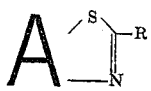

where A represents an aromatic nucleus, for example of the benzene or naphthalene series, and R represents the residue from a carboxylic acid; by condensing a compound of the formula

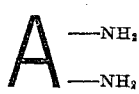

or

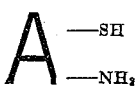

or

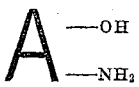

the substituent groups being adjacent on the same ring, with a carboxylic acid, or derivative thereof, in the presence of polyphosphoric acid, and to certain novel compounds so produced.

It is surprising that three such different series of compounds as the benzimidazoles, benzothiazoles and benzoxazoles can be produced under similar reaction conditions and in such high yields. The benzimidazoles, benzothiazoles and benzoxazoles so produced are useful as intermediates for the production of other chemical compounds and are useful in themselves as brighteners, dyestuffs, pigments, ultra-violet absorbers and as pharmaceuticals and agricultural chemicals.

Heretofore a common method of preparing these compounds involved the reaction of a carboxylic acid, or a functional derivative thereof, such as an ester, amide or a nitrile with an o-phenylenediamine, o-aminophenol or o-aminothiophenol or the corresponding compounds of the naphthalene series. The production of benzimidazoles from o-phenylenediamines and carboxylic acids, acid anhydrides, esters, nitriles and amides is treated at length in the book Heterocyclic Compounds, Imidazole and Derivatives, Klaus Hofman, Interscience Publishers Inc., New York, 1953, page 260 and following. The use of a large series of compounds and ring closure in the presence of hydrochloric acid or sulfuric acid is disclosed. The method is operable with both mono basic acids such as formic acid or acetic acid, or higher acids, and with polybasic acids such as succinic acid.

The production of benzoxazoles from acids is disclosed by Wheeler, American Chemical Journal 17, 397 (1895). The production of benzothiazoles is disclosed by Hofman, Ber. 13, 223 (1880).

At times the reactions have proceeded extremely slowly or with poor yields, or both. To force the reaction at a reasonable rate, it has often been necessary to use an autoclave to attain a sufficiently high temperature, and even with an elevated temperature, the yields have been frequently low. In some instances the presence of certain groups interferes with the reaction and then, regardless of the temperature used, or the length of the heating period, little or none of the desired product is obtained. This is true for example of aromatic acids containing an amino group ortho to the carboxyl group. Various attempts have been made to substitute other reaction media to improve this process and do away with some of the disadvantages, but those attempts have been only partially successful.

By employing polyphosphoric acid as the reaction medium for the preparation of benzimidazoles, benzothiazoles and benzoxazoles increased yields of the desired products are obtained within a much shorter time, and without the necessity for conducting the reaction in closed pressure vessels. This is most surprising since the past attempts to use other acidic media to obtain increased yields, such as sulfuric acid of high concentrations, have been unsuccessful. Sulfonation or charring of the reactants and products, for example, at the temperature necessary to cause the reaction to proceed, has often resulted to a considerable extent. Fuming and decomposition of the products often results at the higher temperatures. It is most surprising that an acidic reaction medium like polyphosphoric acid gives such improved results.

It is not known just why the polyphosphoric acid produces these greatly improved results; the effect is particularly surprising when it is considered that in certain instances by the use of polyphosphoric acid it is possible to produce products otherwise unobtainable by this type of reaction.

For example, it is not possible to obtain a benzimidazole derivative by the reaction of anthranilic acid with o-phenylenediamine, in solvents such as 50% sulfuric acid, 70% sulfuric acid, or orthophosphoric acid.

However, by the use of the present polyphosphoric acid process, a very good yield of 2-(o-aminophenyl)-benzimidazole is readily obtainable. It is therefore clear that the polyphosphoric acid exerts a very definite but as yet unexplained influence upon the course of the reaction.

The reaction for the preparation of these benzazoles may be represented as follows:

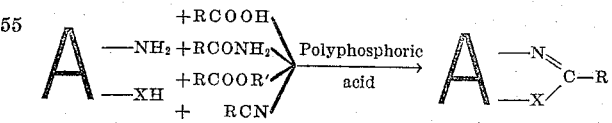

where X is selected from the group consisting of NH, S and O, and R is H or an organic radical, and A is an aromatic carboxylic radical of not more than two rings, the attachment of the XH being ortho to the $NH_2$ group. The polyphosphoric acid referred to is an article of commerce and is obtainable with various concentrations of $P_2O_5$. The polyphosphoric acid which is used in the process may have a $P_2O_5$ content of about 75% to about 89%. However, the preferred $P_2O_5$ concentration of the polyphosphoric acid is from about 82% to 84%, which is the concentration of commercially available polyphosphoric acid.

In the practice of this invention, various temperatures may be used, from about 100° C. to about 350° C. The lower limit of temperature is governed by the physical properties of the polyphosphoric acid, in that below about 100° C. it becomes very viscous and stirring difficulties are encountered. The actual temperature for a particular reaction is one chosen that will result in the reaction going to completion within a reasonable time. The temperatures used generally fall in the range of about 125° C. to about 250° C. However, especially when interferring groups are present, temperatures as high as 300° C. may be used.

Usually the minimum amount of polyphosphoric acid is used which permits efficient stirring of the reaction mixture. Larger amounts may be used, and the upper limit is governed only by economic considerations. From about 5 parts to 40 parts of polyphosphoric acid per part of the carboxylic acid or its derivative is an effective range, considering economy and stirrability. About 15 to 20 parts is frequently preferred.

As the amino component, there may be used o-phenylene diamine, o-aminophenol, o-aminothiophenol, or a 1,2- or a 2,3-naphthalene diamine, or a 1,2- or 2,1- or 2,3- or 3,2-aminonaphthol or aminothionaphthol, or substitution products thereof where the substituent is inert to the action of the carboxylic acid group. Such substituents include halogens, such as chloro, bromo, fluoro, or iodo, alkyl groups such as methyl, ethyl, propyl or higher alkyl groups, alkoxy groups, such as methoxy, ethoxy or higher alkoxy, or nitro groups. Additional amino, thio or hydroxy groups may be present on the rings, although if ortho to an amino group these may competitively enter the reaction. Similarly carboxy groups may be present, although this then permits reactions competitive with the added acid.

In the practice of our invention, various carboxylic acids may be used, or functional derivatives of carboxylic acids. These include amides, nitriles, esters, and anhydrides of the acids. Among the acids suitable are aliphatic carboxylic acids such as formic, acetic, propionic, butyric, fumaric, trimethyl acetic, isovaleric, β-chloropropionic, lauric, palmitic, stearic, bromoacetic, diphenylacetic, β-naphthylacetic, etc.; aromatic acids of the benzene series such as benzoic acid or benzoic acid substituted in the ortho, meta or para position with an amino group; the benzoic acids may also be substituted with alkyl groups such as methyl and ethyl; halo such as chloro and bromo; hydroxy; alkoxy, such as ethoxy, methoxy; phenyl sulfonyl, dimethylamino, phenoxy, phenyl, β-phenylethyl, diphenylamino, benzhydryl, benzyl, mercapto, methylthio, thenyl, tolyl, etc.; aromatic acids of the naphthalene series such as beta-hydroxynaphthoic acid, alpha-naphthoic acid, β-naphthoic acid, 2-chloro-naphthoic acids, 5,8-dichloro-naphthoic acids, 1-methyl-naphthoic acids, 1-hydroxy-naphthoic acids, 5-bromo-naphthoic acids, 3-amino-naphthoic acids, etc.; heterocyclic acids such as nicotinic acid, isonicotinic acid, etc.; picolinic acid, quinolinic acid, furoic acid, thiophene-2-carboxylic acid, etc.

When using dibasic carboxy acids it is possible to obtain a carboxylic acid substituted product. However, if stoichiometric quantities of amino components are used, both carboxylic groups can be caused to react resulting in the formation of a bis azole compound. When an aromatic ortho dicarboxylic acid is used, a compound having a lactam ring structure may be formed.

In the following examples, which illustrate but do not limit this invention, parts are by weight unless otherwise specified.

EXAMPLE 1

Benzimidazole

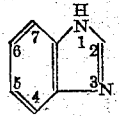

A mixture of 9.4 parts of anhydrous formic acid, 23.8 parts of o-phenylene diamine and 300 parts of polyphosphoric acid is heated at 125° C. with stirring for 3½ hours, when the reaction is substantially complete; the mixture is then poured into 1 liter of water to yield a dark brown solution. Concentrated ammonium hydroxide is added to the solution until a heavy white precipitate forms completely and the latter is then removed by filtration; the strongly ammoniacal solution is then evaporated to dryness on a steam bath. Extraction of the residue with two 500-part portions of boiling ethanol and evaporation of the combined extract gives a 42% yield (10 parts) of benzimidazole. The product may be recrystallized from water.

EXAMPLE 2

2-phenyl-benzimidazole

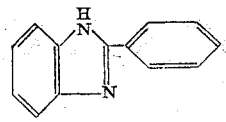

A mixture of 24.4 parts of benzoic acid, 21.6 parts of o-phenylenediamine and 400 parts of polyphosphoric acid is heated at about 175° C. with stirring for 2 hours until the reaction is substantially complete. The mixture is then cooled to 100° C. and poured into 2 liters of water causing the formation of a light gray solid precipitate, the solid is collected by filtration, reslurried with 1000 parts of water and treated with dilute sodium hydroxide until the mixture is just alkaline to phenolphthalein indicator paper. The precipitate is collected, washed free of alkali with water and dried in an oven to give 95% yield of 2-phenylbenzimidazole. The product may be purified by crystallization from aqueous alcohol.

EXAMPLE 3

2-phenyl-benzimidazole

A mixture of 20.6 parts of benzonitrile, 23.8 parts of o-phenylenediamine and 400 parts of polyphosphoric acid is heated at 250° C. with stirring for 4 hours until the reaction is substantially complete. The mixture is then cooled and poured into 2000 parts of water causing the formation of a gray solid material. The solid is removed by filtration, washed with water and reslurried with 200 parts of 10% sodium carbonate solution. The insoluble residue is removed by filtration and washed with water until alkali-free. A 99.6% yield of 2-phenyl-benzimidazole is thus obtained.

EXAMPLE 4

2-phenyl-benzimidazole

A mixture of 24.2 parts of benzamide, 23.8 parts of o-phenylenediamine and 400 parts of polyphosphoric acid is heated at about 250° C. with stirring for 4 hours until the reaction is substantially complete. The mixture is then cooled to 125° C. and poured into about 2000 parts of water causing the separation of a bluish gray solid material. This precipitate is collected by filtration, washed with water and reslurried in 200 parts of 10% sodium carbonate solution. The insoluble residue is then removed by filtration, washed with water until alkali-free and dried in the oven giving a 99.8% yield of 2-phenyl-benzimidazole.

EXAMPLE 5

2-(o-aminophenyl)-benzimidazole

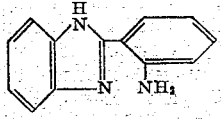

A mixture of 68.5 parts of anthranilic acid, 54.1 parts of o-phenylenediamine and 1000 parts of polyphosphoric acid is heated at 250° C., with stirring for 3½ hours until the reaction is substantially complete. The mixture is then cooled and poured into 3000 parts of water. The dark green solution which forms is clarified by filtration, and thereto is added 50% sodium hydroxide solution with cooling until the mixture is just alkaline to phenolphthalein indicator paper. The pink solid which forms is separated by filtration, washed free of alkali with water and oven dried giving a 72% yield of 2-(o-aminophenyl)-benzimidazole. The same reaction conducted at 300° C. gives a yield of 62%.

The reaction fails when the reactants are refluxed in 50% or 70% sulfuric acid, or heated in orthophosphoric acid at 250° C.

EXAMPLE 6

*2-(m-tolyl)-benzimidazole*

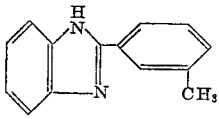

A mixture of 27.2 parts of m-toluic acid, 23.8 parts of o-phenylene diamine and 300 parts of polyphosphoric acid is heated at 250° C. with stirring for 3½ hours until the reaction is complete. The mixture is then cooled and poured into 2000 parts of water causing precipitation of a gray solid material. The solid material is collected by filtration, washed with water and then reslurried with 200 parts of 10% sodium carbonate solution. The insoluble portion is separated by filtration, washed with water and then dried giving a 99% yield of 2-(m-tolyl)-benzimidazole.

EXAMPLE 7

*2-(o-chlorophenyl)-benzimidazole*

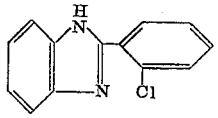

A mixture of 31.3 parts of o-chlorobenzoic acid, 23.8 parts of o-phenylenediamine and 400 parts of polyphosphoric acid is heated at about 250° C. with stirring for 3½ hours until the reaction is substantially complete; the mixture is then cooled and drowned in 2000 parts of water. The resulting dark red solution is clarified by filtration and treated with 50% sodium hydroxide solution with cooling, until the mixture is just alkaline to phenolphthalein indicator paper. The precipitate which forms is separated by filtration, washed with water and reslurried with 200 parts of 10% sodium carbonate solution. The gray residue is separated by filtration, washed with water and dried giving a 90% yield of 2-(o-chlorophenyl)-benzimidazole.

EXAMPLE 8

*2-(o-hydroxyphenyl)-benzimidazole*

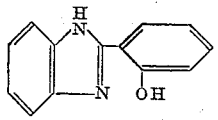

A mixture of 27.6 parts of salicyclic acid, 23.8 parts of o-phenylenediamine and 400 parts of polyphosphoric acid is heated at about 250° C. with stirring for 4½ hours until the reaction is substantially complete. The mixture is then cooled and poured into 2000 parts of water causing the formation of a reddish-tan solid precipitate. The solid is collected by filtration, reslurried with 200 parts of 10% sodium carbonate solution, and the residue is again removed by filtration and washed with water. A 36% yield of 2-(o-hydroxyphenyl)-benzimidazole is obtained.

EXAMPLE 9

*2-(3,4-dichlorophenyl)-benzimidazole*

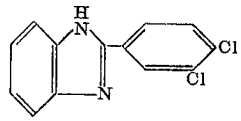

A mixture of 38.2 parts of 3,4-dichlorobenzoic acid, 23.8 parts of o-phenylenediamine and 400 parts of polyphosphoric acid is heated at about 250° C. with stirring for 4 hours until the reaction is complete; the mixture is then cooled and poured into 2000 parts of water giving a bright blue solid precipitate. The blue solid material is separated by filtration, washed with water, and reslurried in 200 parts of 10% sodium carbonate solution. The insoluble residue is then separated by filtration and washed with water until non-alkaline to brilliant yellow indicator paper. After drying there is obtained a 99% yield of 2-(3,4-dichlorophenyl)-benzimidazole.

EXAMPLE 10

*2-(2-amino-4-chlorophenyl)-benzimidazole*

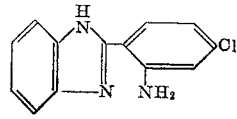

A mixture of 34.4 parts of 4-chloroanthranilic acid, 23.8 parts of o-phenylenediamine and 400 parts of polyphosphoric acid is heated with stirring at about 250° C. for 4 hours until the reaction is substantially complete; the mixture is then cooled and poured into 2000 parts of water causing the formation of a dark blue solid material which is separated by filtration and washed with water. The solid material is then reslurried in 200 parts of 10% sodium carbonate solution and the insoluble portion is then separated by filtration and washed free of sodium carbonate with water. After drying there is obtained a 85% yield of 2-(2-amino-4-chlorophenyl)-benzimidazole.

EXAMPLE 11

*2-(o-carboxyphenyl)-benzimidazole*

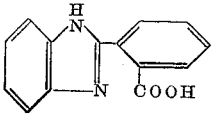

A mixture of 29.6 parts of phthalic anhydride, 23.8 parts of o-phenylenediamine and 400 parts of polyphosphoric acid is heated at 250° C. with stirring for 4 hours and is then cooled and poured into 2000 parts of cold water. The solid is separated by filtration, washed with water and reslurried in 200 parts of 10% sodium carbonate solution. The insoluble material is then separated by filtration, washed with water until free of carbonate and dried, giving a 61% yield of 2-(o-carboxyphenyl)-benzimidazole.

EXAMPLE 12

*2-(p-carboxyphenyl)-benzimidazole*

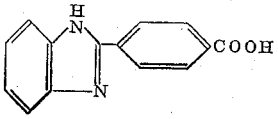

A mixture of 16.6 parts of terephthalic acid, 10.8 parts of o-phenylenediamine and 300 parts of polyphosphoric acid is heated with stirring at about 300° C. A clear green-brown solution results. The temperature is then lowered gradually to 200° C. and kept at that temperature until the reaction is complete. It is then cooled gradually to about 100° C. and 500 parts of water are added. The whole is then drowned in 1500 parts of water and the green solid which precipitates is separated by filtration. The solid phase is washed with water and slurried with dilute sodium bicarbonate solution. The green solid is again separated by filtration and dissolved in 500 parts of water and 250 parts of 5 normal sodium hydroxide solution. After treatment with activated charcoal the product is reprecipitated by the addition of 140 parts of concentrated hydrochloric acid; the product in the form of a yellow solid is separated by filtration, giving 17.8 parts of 2-(p-carboxyphenyl)-benzimidazole.

EXAMPLE 13

*3-(2-benzimidazolyl)-naphthol-(2)*

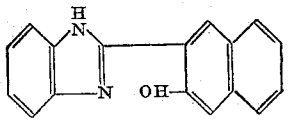

A mixture of 37.6 parts of 2-naphthol-3-carboxylic acid, 23.8 parts of o-phenylenediamine and 400 parts of polyphosphoric acid is heated at about 250° C. with stirring for 4½ hours until the reaction is complete. The mixture is then cooled and poured into 2000 parts of cold water to yield a gray-black solid material. The solid product is separated by filtration, washed with water and reslurried with 200 parts of 10% sodium carbonate solution; the solid is then again separated, washed with water until the washings are neutral and then extracted with six 250 part portions of boiling ethanol. The combined extracts are diluted with an equal volume of water and the 3-(2-benzimidazolyl)-naphthol-(2) in the form of a yellow-brown precipitate is obtained. A yield of 18 parts is obtained.

EXAMPLE 14

*1-2-bis-(2-benzimidazolyl)-ethylene*

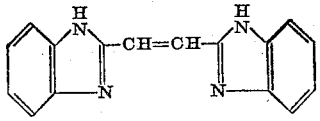

A mixture of 21.6 parts of o-phenylenediamine, 11.6 parts of fumaric acid and 179 parts of polyphosphoric acid is heated gradually to 180° C. After cooling the mixture is poured into 400 parts of ice forming a thick tarry mass. This is warmed slightly and the mixture is made alkaline by the addition of ammonium hydroxide. A light brown precipitate results which is separated by filtration and washed with water until neutral in reaction. The precipitate, consisting of the crude 1,2-bis-(2-benzimidazolyl)-ethylene is removed by filtration. 15.6 parts is obtained. It may be further purified by precipitation from alkaline or acidic solution.

EXAMPLE 15

*1,2,3,4-tetrachloro-11-isoindolo [2,1-a] benzimidazol-11-one*

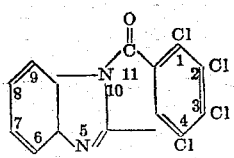

A mixture of 57.2 parts of tetrachloro phthalic anhydride, 23.8 parts of o-phenylenediamine and 400 parts of polyphosphoric acid is heated at 250° C. for 4 hours. The resultant mixture is then cooled, and poured into 2000 parts of cold water. The resulting solid is removed by filtration, washed with water and reslurried with 200 parts of 10% sodium carbonate solution. The insoluble residue is removed by filtration, washed with water until free of carbonate and then dried. The dry solid is extracted with 600 parts of boiling nitrobenzene and the extract is then cooled in an ice bath and diluted with an equal volume of anhydrous ethyl ether giving a yellow precipitate, which is isolated. The yield is 89 grams. The resultant 1,2,3,4-tetrachloro-11-isoindolo [2,1-a] benzimidazol-11-one may be further purified by crystallization from boiling xylene, resulting in a purified product in the form of small bright yellow needles which exhibit a strong greenish-yellow fluorescence under ultraviolet irradiation. The product is a pigment for lacquers. A second product, 2-(2-benzimidazolyl)-3,4,5,6-tetrachlorobenzoic acid, can also be isolated from the nitrobenzene extract.

EXAMPLE 16

*Benzene-1,4-bis-(5-(6)-chloro-2-benzimidazole)*

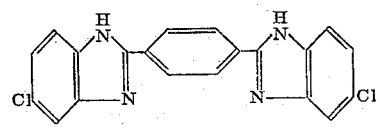

A mixture of 3.2 parts of terephthalic acid, 6.3 parts of 4-chloro-o-phenylenediamine and 100 parts of polyphosphoric acid is heated with stirring at 165–175° C. until the reaction is complete. A dark bluish colored melt results and is cooled to room temperature and then drowned in 500 parts of water. The precipitated material is removed by filtration and is then reslurried in dilute ammonium hydroxide solution. The solid is again removed by filtration and dissolved in 120 parts of ethanol containing 15 parts of 50% sodium hydroxide solution. After treatment with activated charcoal the product is again precipitated by acidification with dilute hydrochloric acid. After filtration, the crude benzene-1,4-bis-(5-(6)-chloro-2-benzimidazole) obtained is further purified by repeated precipitation from alkaline and acidic solution.

EXAMPLE 17

*2-(beta-pyridyl)-benzimidazole*

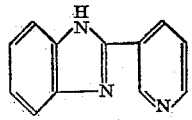

A mixture of 24.6 parts of nicotinic acid, 23.8 parts of o-phenylenediamine and 400 parts of polyphosphoric acid is heated at 250° C. for 4½ hours. The mixture is then cooled and poured into 2000 parts of water. After removal of a black amorphous solid by filtration, the brown solution is treated with a 50% sodium hydroxide solution until the mixture is alkaline to phenolphthalein idicator paper; the tan precipitate which forms is removed by filtration, washed with water and dried. The product consisting of 2-(beta-pyridyl)-benzimidazole is obtained in the form of a tan solid. On recrystallization from aqueous ethanol, a light pink powder is obtained.

EXAMPLE 18

*2-methyl-benzimidazole*

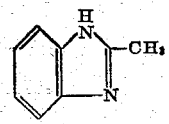

A mixture of 12 parts of glacial acetic acid, 23.8 parts of o-phenylenediamine and 400 parts of polyphosphoric acid is heated at about 125° C. with stirring for 4 hours. The mixture is then poured into 2000 parts of water and the resulting dark amber colored solution is treated with concentrated ammonium hydroxide until the precipitation of a white solid is complete; the white inorganic material is removed by filtration. The yellow alkaline filtrate is then evaporated to dryness on the steam bath and the resulting brown solid residue is extracted with approximately three 500-part portions of boiling ethanol. Evaporation of the combined ethanolic extract on the steam bath gives a quantitative (100%) yield of 2-methyl-benzimidazole in the form of a yellow solid.

EXAMPLE 19

*2-phenyl-benzoxazole*

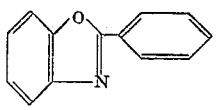

A mixture of 24.4 parts of benzoic acid, 21.8 parts of o-aminophenol and 400 parts of polyphosphoric acid is heated at about 250° C. with stirring for 4 hours. The mixture is then cooled and poured into 2000 parts of water causing the precipitation of a gray solid material. The solid is then removed by filtration, washed with water and reslurried in 200 parts of 10% sodium carbonate solution. The insoluble residue is then collected, washed with water until free of sodium carbonate and dried in an oven to give 36.2 parts of 2-phenyl-benzoxazole. The product is dark gray. On recrystallization from aqueous alcohol long pink needles are obtained.

EXAMPLE 20

*5-chloro-2-phenyl-benzoxazole*

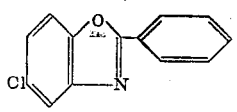

A mixture of 24.4 parts of benzoic acid, 28.7 parts of 4-chloro-2-aminophenol and 400 parts of polyphosphoric acid is heated at 250° C. with stirring for 4 hours. The mixture is then poured into 2000 parts of water, giving a deep blue slurry. The solid material is removed and reslurried in 200 parts of 10% sodium carbonate solution and the dark blue insoluble portion is removed and reslurried in 200 parts of 10% sodium carbonate solution and the dark blue insoluble portion is removed by filtration, washed with four 100 part portions of cold water and dried. The dry residue is then extracted with 600 parts of boiling ethanol and after a treatment with activated charcoal the hot ethanol solution is treated with hot water until crystallization starts. Upon cooling a 23.8 part yield of 2-phenyl-5-chloro benzoxazole in the form of a crystalline solid is obtained.

EXAMPLE 21

*2-phenyl-benzothiazole*

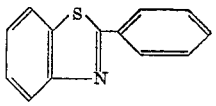

A mixture of 24.4 parts of benzoic acid, 25.5 parts of o-aminothiophenol and 400 parts of polyphosphoric acid is heated at about 250° C. with stirring for 4 hours. The mixture is then cooled and poured into 2000 parts of water causing the formation of a gray solid material. The precipitated solid is collected by filtration, washed with water and reslurried in 200 parts of 10% sodium carbonate solution. The insoluble portion is removed by filtration, washed free of sodium carbonate with water and then dried to give 43.8 parts of 2-phenyl-benzothiazole. On crystallization from 70% aqueous alcohol, light tan needles are obtained.

EXAMPLE 22

*2-(o-hydroxyphenyl)-benzothiazole*

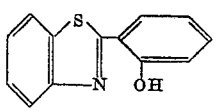

A mixture of 25 parts of o-aminothiophenol, 27.6 parts of salicylic acid, and 400 parts of polyphosphoric acid is heated to 200° C. until the reaction is complete. The solution is then drowned in 3000 parts of water and the gray precipitate which forms is removed by filtration. The solid is washed acid-free with water and is then slurried in dilute sodium bicarbonate solution and removed by filtration. The crude product is further purified by treatment with activated charcoal and is then exextract, a 51% yield of 2-(o-hydroxyphenyl)-benzothiazole is obtained.

EXAMPLE 23

*2-(o-aminophenyl)-benzothiazole*

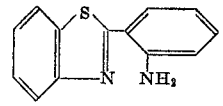

A mixture of 27.4 parts of anthranilic acid, 25.5 parts of o-aminothiophenol and 400 parts of polyphosphoric acid is heated at about 250° C. with stirring for 4 hours, at which time the reaction is complete. The mixture is then cooled and poured into 2000 parts of water to yield a brown solid material; the precipitated solid is removed by filtration, washed with water and reslurried with about 200 parts of 10% sodium carbonate solution. The insoluble portion is collected, washed free of sodium carbonate with water and dried in the oven giving 35.6 parts of 2-(o-aminophenyl)-benzothiazole.

EXAMPLE 24

*2-(2,4-dihydroxyphenyl)-benzothiazole*

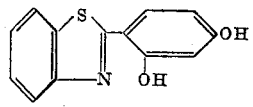

The procedure of Example 23 is followed except that 30.8 parts of resorcylic acid is used in place of the salicylic acid. A yield of 48% of theoretical of 2-(2,4-dihydroxyphenyl)-benzothiazole is obtained.

EXAMPLE 25

*2-phenyl-benzimidazole*

A mixture of 27.2 parts of methyl benzoate, 21.6 parts of o-phenylenediamine and 400 parts of polyphosphoric acid is heated at 175° C. with stirring for two hours until the reaction is substantially complete. The mixture is then cooled and poured into 2000 parts of water causing the formation of a gray solid material. The solid is removed by filtration, washed with water and reslurried in 700 parts of 10% sodium carbonate solution. The insoluble residue is removed by filtration and washed with water until alkali-free. A 97% yield of 2-phenyl-benzimidazole is thus obtained.

EXAMPLE 26

*2-(o-bromophenyl)-benzimidazole*

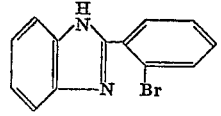

The substitution of 40.2 parts of o-bromobenzoic acid for the o-chlorobenzoic acid in the procedure of Example 7 gives 2-(o-bromophenyl)-benzimidazole in 81% yield.

EXAMPLE 27

*2-phenyl-naphth[1,2]imidazole*

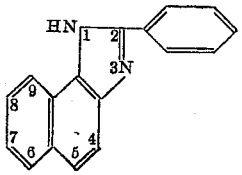

A mixture of 6.1 parts of benzoic acid, 7.9 parts of 1,2-naphthalenediamine and 150 parts of polyphosphoric acid is heated at 250° C. with stirring for four hours when the reaction is substantially complete. The mixture is then cooled and poured into 500 parts of water causing the formation of a gray solid material. The solid is removed by filtration, reslurried with 100 parts of water and treated with concentrated ammonium hydroxide until the slurry is alkaline to brilliant yellow indicator paper. The insoluble residue is collected by filtration, washed with water, and dried. The solid is placed in a continuous extractor and extracted with hot ethanol until the extracts cease to show a strong blue fluorescence under ultraviolet irradiation. Evaporation of the alcoholic extract gives 2-phenyl-naphth[1,2] imidazole in good yield. The product may be further purified by recrystallization from aqueous alcohol.

EXAMPLE 28

*2-phenyl-naphth[2,3]oxazole*

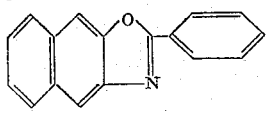

A mixture of 24.4 parts of benzoic acid, 31.8 parts of 3-amino-2-naphthol and 400 parts of polyphosphoric acid is heated at 250° C. for four hours when the reaction is substantially complete. The mixture is then cooled and poured into 2000 parts of water causing the formation of a gray solid material. The solid is removed by filtration, washed with water and reslurried in 750 parts of 10% sodium carbonate solution. The insoluble residue is removed by filtration and washed with water until alkali-free. 2-phenyl-naphth[2,3]oxazole is obtained in good yield. The product may be purified by recrystallization from a benzene-petroleum ether mixture.

EXAMPLE 29

*2-phenyl-naphtho[2,3]thiazole*

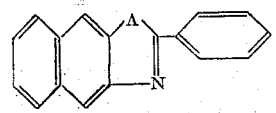

The substitution of 35.0 parts of 2-amino-3-thionaphthalene for the 3-amino-2-naphthol in the procedure of Example 28 gives 2-phenyl-naphtho[2,3]thiazole in good yield.

We claim:
The process of preparing 2-(o-aminophenyl)-benzimidazole which comprises heating in the presence of polyphosphoric acid, o-phenylenediamine, and anthranilic acid.

References Cited in the file of this patent

Snyder et al.: JACS, vol. 72, pp. 2962–7 (1950).
Horning et al.: JACS, vol. 73, pp. 5826–8 (1951).
Wright: Chem. Reviews, vol. 48, pp. 398–9, 465 (1951).
Kissman et al.: JACS, vol. 74, pp. 3948–9 (1952).
Koo: JACS, vol. 75, pp. 1891–5 (1953).
Hurd et al.: J. Am. Chem. Soc., vol. 76, pp. 5065–9 (1954).
Uhlig: Angew. Chem., vol. 66, pp. 435–6 (1954).

UNITED STATES PATENT OFFICE
CERTIFICATE OF CORRECTION

Patent No. 2,985,661 May 23, 1961

Delton W. Hein et al.

It is hereby certified that error appears in the above numbered patent requiring correction and that the said Letters Patent should read as corrected below.

Column 5, line 65, for "salicyclic" read -- salicylic --; column 10, line 7, for "ex-" read -- extracted with hot ethanol. By cooling the hot ethanol --; column 12, lines 9 to 12, in the formula, at the top point of the three-quarter benzene ring, for "A" read -- S --.

Signed and sealed this 17th day of October 1961.

(SEAL)
Attest:

ERNEST W. SWIDER
Attesting Officer

DAVID L. LADD
Commissioner of Patents
USCOMM-DC